(12) United States Patent
Nam et al.

(10) Patent No.: US 9,519,370 B2
(45) Date of Patent: Dec. 13, 2016

(54) DISPLAY DEVICE AND METHOD FOR DRIVING THE SAME

(71) Applicant: Samsung Display Co., Ltd., Yongin, Gyeonggi-do (KR)

(72) Inventors: Hui Nam, Yongin-si (KR); Beom Shik Kim, Yongin-si (KR); Jun Il Kwon, Seongnam-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 57 days.

(21) Appl. No.: 14/044,201

(22) Filed: Oct. 2, 2013

(65) Prior Publication Data

US 2014/0354617 A1 Dec. 4, 2014

(30) Foreign Application Priority Data

May 31, 2013 (KR) .................. 10-2013-0062727

(51) Int. Cl.
*G06F 3/041* (2006.01)

(52) U.S. Cl.
CPC .......... *G06F 3/0414* (2013.01); *G06F 3/0412* (2013.01); *G06F 2203/04102* (2013.01)

(58) Field of Classification Search
CPC G09G 3/3688; G09G 3/3648; G09G 2380/02; G06F 3/0414
USPC .................. 345/30, 55, 87, 92, 204, 212
See application file for complete search history.

(56) References Cited

U.S. PATENT DOCUMENTS

| | | | |
|---|---|---|---|
| 5,942,733 A | 8/1999 | Allen et al. | |
| 8,928,596 B2* | 1/2015 | Hayashi ................ | G06F 3/044 |
| | | | 178/18.03 |
| 9,087,489 B2* | 7/2015 | Yamazaki .......... | G02F 1/13318 |
| 2002/0156593 A1* | 10/2002 | Hayes et al. .................. | 702/127 |
| 2006/0221226 A1* | 10/2006 | Yanof et al. .................. | 348/346 |
| 2009/0001271 A1* | 1/2009 | Erdtmann et al. ........... | 250/347 |
| 2010/0194710 A1* | 8/2010 | Koito et al. .................. | 345/174 |
| 2012/0133621 A1* | 5/2012 | Kim ........................... | 345/204 |
| 2013/0278486 A1* | 10/2013 | Duerksen et al. ............. | 345/55 |
| 2013/0278624 A1* | 10/2013 | Abe ............................. | 345/619 |
| 2013/0285896 A1* | 10/2013 | Lim ............................ | 345/156 |
| 2014/0035869 A1* | 2/2014 | Yun et al. .................... | 345/174 |
| 2014/0055702 A1* | 2/2014 | Park et al. ..................... | 349/43 |
| 2014/0101560 A1* | 4/2014 | Kwak et al. ................. | 715/738 |
| 2014/0111417 A1* | 4/2014 | Son .............................. | 345/156 |
| 2014/0160327 A1* | 6/2014 | Enoki et al. ................. | 348/294 |
| 2014/0204285 A1* | 7/2014 | Jang ............................. | 349/12 |
| 2014/0232841 A1* | 8/2014 | Ohta ..................... | H04N 5/321 |
| | | | 348/65 |
| 2014/0306985 A1* | 10/2014 | Jeong et al. .................. | 345/601 |

(Continued)

FOREIGN PATENT DOCUMENTS

| | | |
|---|---|---|
| KR | 10-2012-0015890 A | 2/2012 |
| KR | 10-2012-0038334 A | 4/2012 |
| KR | 10-2012-0114961 A | 10/2012 |

*Primary Examiner* — Ricardo L Osorio
(74) *Attorney, Agent, or Firm* — Knobbe Martens Olson & Bear LLP

(57) ABSTRACT

A display device and a method for driving the same are disclosed. In one aspect, the display device includes a plurality of pixels defined on a substrate and a sensor formed in at least one of the plurality of pixels and adjacently arranged at the same vertical level as that of a thin film transistor formed on the substrate to sense bending of the substrate and pressure that is applied to the substrate.

20 Claims, 10 Drawing Sheets

(56) References Cited

U.S. PATENT DOCUMENTS

2014/0320715 A1* 10/2014 Haji-Khamneh et al. .... 348/302

* cited by examiner

DISPLAY DEVICE AND METHOD FOR DRIVING THE SAME

CROSS-REFERENCE TO RELATED APPLICATIONS

This application is based on and claims priority from Korean Patent Application No. 10-2013-0062727, filed on May 31, 2013 in the Korean Intellectual Property Office, the disclosure of which is incorporated herein in its entirety by reference.

BACKGROUND

Field

The described technology generally relates to a display device and a method for driving the same.

Description of the Related Technology

Typically, a display device is classified into a light emitting type and a light receiving type. A light emitting type display includes a plasma display device or an electroluminescence device. A light receiving type display includes a liquid crystal display. Among them, an electroluminescence device generally has the advantages of a wide viewing angle, superior contrast, and a high response speed, and has been recognized as the next-generation display. Such an electroluminescence device is classified into an inorganic light emitting display device and an organic light emitting display device depending on a material that forms a light emitting layer thereof.

Typically, a display device includes sensors separately attached thereto to perform a screen control function using an input signal, that is input through a contact with a user's hand or a pen. Such a sensor may include a resistive sensor which recognizes a position through an electrical signal that is generated when an upper electrode layer and a lower electrode layer come in contact with each other due to pressing with a user's finger or a pen, and a capacitive sensor which is driven through sensing static electricity that is generated through the user's finger.

SUMMARY OF CERTAIN INVENTIVE ASPECTS

One inventive aspect is a display device, which can sense bending of a substrate and pressure applied to the substrate, and thus can reduce the manufacturing costs and manufacturing processes.

Another aspect is a method for driving a display device, which can sense bending of a substrate and pressure applied to the substrate, and thus can reduce the manufacturing costs and manufacturing processes.

Additional advantages, subjects, and features of the disclosed technology will be apparent to those having ordinary skill in the art upon examination of the following or may be learned from practice of the described technology.

Another aspect is a display device comprising: a plurality of pixels defined on a substrate; and a sensor formed in at least one of the plurality of pixels and adjacently arranged at substantially the same vertical level as that of a thin film transistor formed on the substrate to sense bending of the substrate and pressure that is applied to the substrate.

Another aspect is a display device comprising: a plurality of pixels defined on a substrate; a thin film transistor formed in each of the plurality of pixels on the substrate, and including an active layer having a channel region, a source region and a drain region positioned on both sides of the channel region, a gate electrode formed on an upper portion of the channel region of the active layer, a source electrode connected to the source region, and a drain electrode connected to the drain region; and a sensor formed in at least one of the plurality of pixels to sense bending of the substrate and pressure that is applied to the substrate, and including a deformation layer formed on substantially the same layer as the active layer, a drive electrode formed on substantially the same layer as the gate electrode and connected to one side of the deformation layer, and a sensing electrode formed on substantially the same layer as the source electrode or the drain electrode and connected to the other side of the deformation layer.

Another aspect is a method for driving a display device, comprising: measuring a sensing voltage using a sensor formed in at least one of the plurality of pixels defined on a substrate and adjacently arranged at substantially the same vertical level as that of a thin film transistor formed on the substrate to sense bending of the substrate and pressure that is applied to the substrate; determining whether the sensing voltage is different from a reference voltage; and sensing that the bending of the substrate or the pressure applied to the substrate occurs if it is determined that the sensing voltage is different from the reference voltage.

According to at least one embodiment of the described technology, the following effects can be achieved.

The display device according to one exemplary embodiment of the described technology often includes the sensor that is adjacently arranged at substantially the same vertical level as that of the thin film transistor, for example, the drive transistor, in the pixel, and the protection film arranged on the lower portion of the substrate, and thus can usually sense the bending of the substrate and the pressure applied to the substrate. Accordingly, the display device according to the embodiment of the described technology can perform various operations with respect to the bending of the substrate and the pressure applied to the substrate, which are considered as input signals.

Further, since the sensor is typically formed together with the thin film transistor, for example, the drive transistor, is formed, it is often not necessary to add a separate process for forming the sensor, and thus the manufacturing costs and manufacturing processes for the separate process for forming the sensor can be reduced.

The effects according to the described technology are not necessarily limited to the contents as exemplified above, but further various effects are included in the description.

BRIEF DESCRIPTION OF THE DRAWINGS

The above and other objects, features and advantages of the described technology will be more apparent from the following detailed description taken in conjunction with the accompanying drawings, in which.

DETAILED DESCRIPTION OF CERTAIN INVENTIVE EMBODIMENTS

Generally, a glass substrate is heavy and can be easily damaged when used in a display device, thus there is a limitation to the portability of a large screen display having a glass substrate. Accordingly, a flexible display device, which uses a flexible substrate, such as plastic, and has lightweight and durability, has been recently developed.

A flexible display device typically includes multiples sensors that can sense pressure applied to the device by a user's finger or a pen that can be used as an input signal, but it may be difficult for the sensors to sense bending of the display device which may be used as another input signal.

Further, it is common to separately attach the sensors to the flexible display, and this increases the manufacturing costs and makes manufacturing processes complicated.

Advantages and features of the described technology and methods of accomplishing the same may be understood more readily by reference to the following detailed description of preferred embodiments and the accompanying drawings. The described technology may, however, be embodied in many different forms and should not be construed as being limited to the embodiments set forth herein. Rather, these embodiments are provided so that this disclosure will convey the concept of the described technology to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the described technology. In this disclosure, the term "connected" includes "electrically connected."

Hereinafter, embodiments of the described technology will be described with reference to the accompanying drawings.

Figure 1:
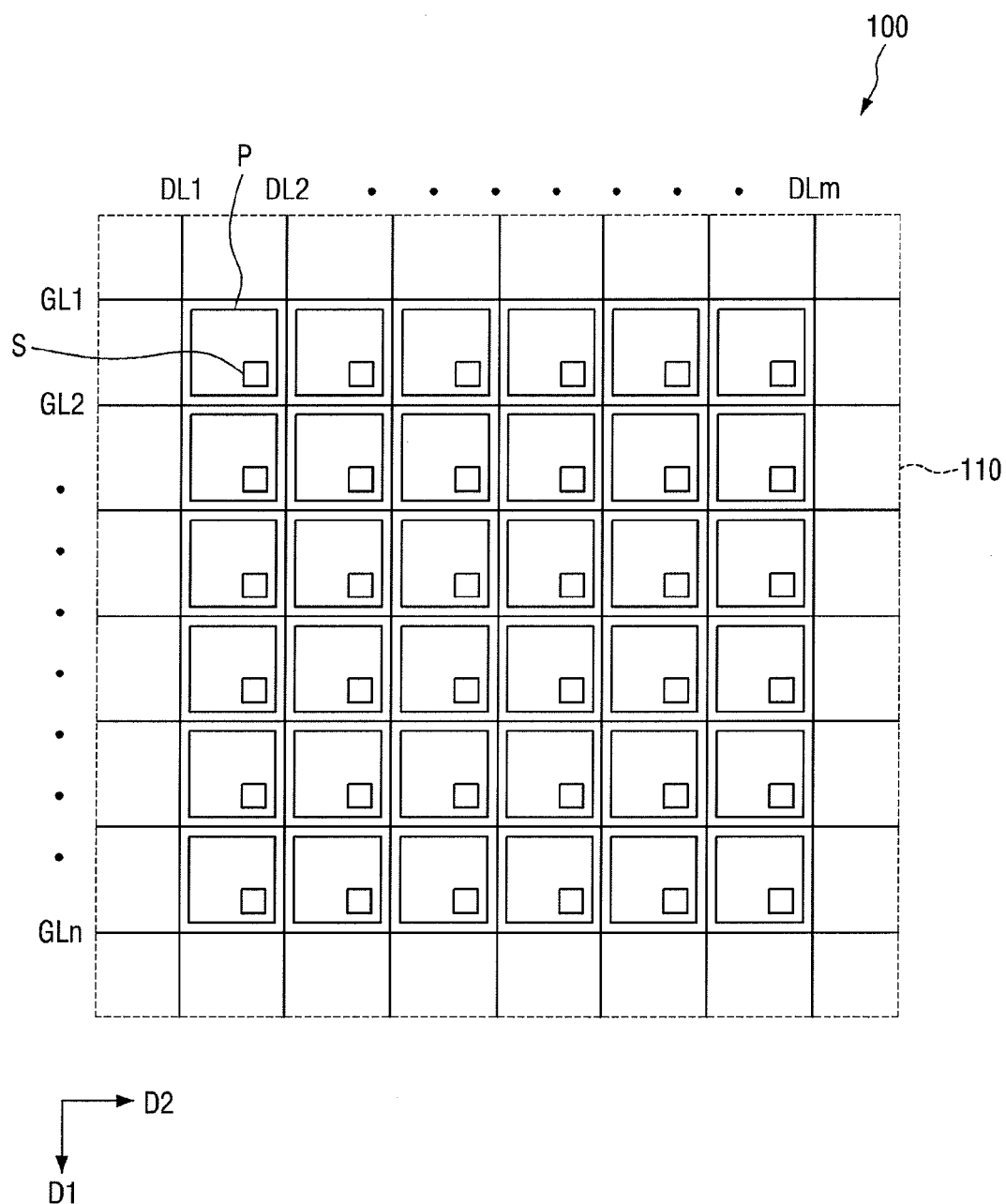
FIG. 1 is a view illustrating a pixel arrangement of a display device according to an exemplary embodiment of the described technology.
Figure 2:
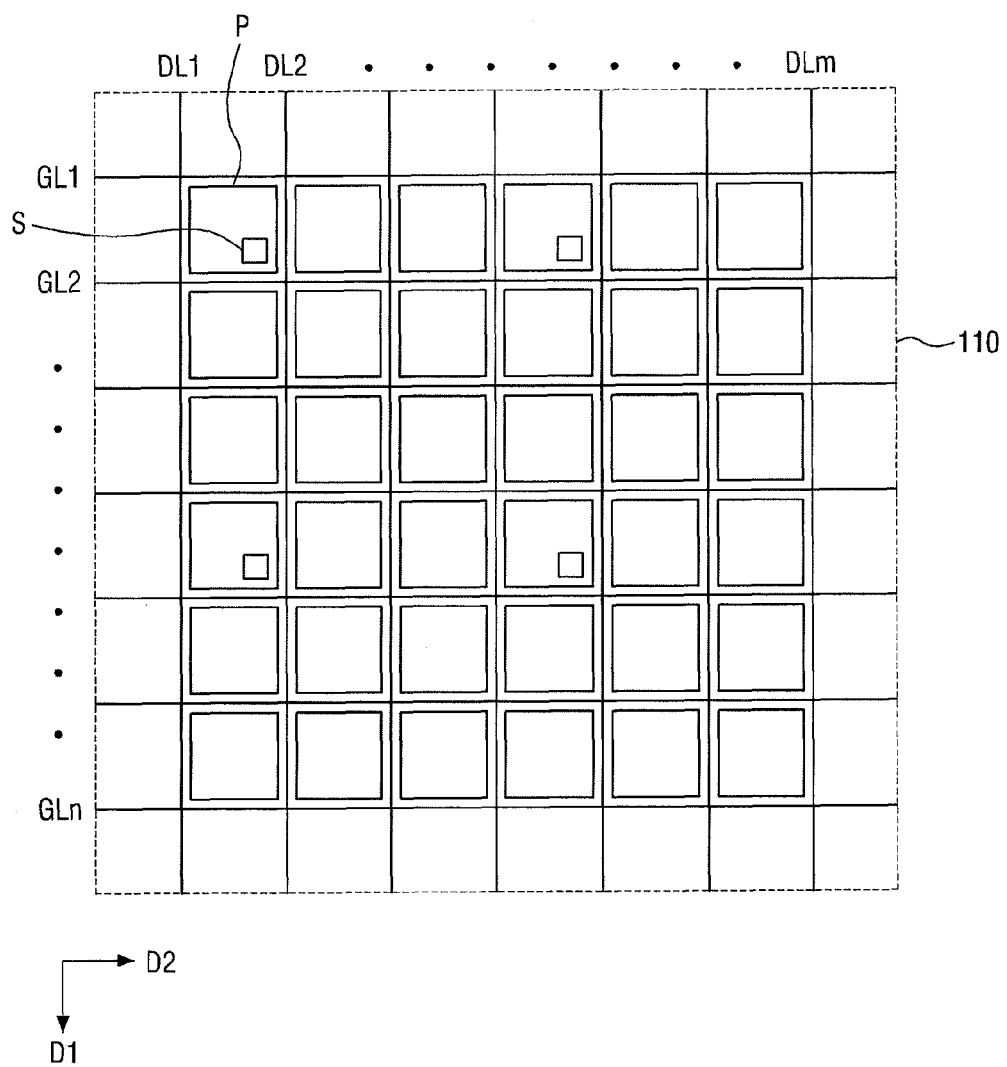
FIG. 2 is an exemplary view illustrating another pixel arrangement of sensors illustrated that can be used with the embodiment shown in FIG. 1.

FIG. 1 is an exemplary view illustrating a pixel arrangement of a display device according to an embodiment of the described technology, and FIG. 2 is a view illustrating another pixel arrangement of sensors illustrated in FIG. 1.

Referring to FIG. 1, a display device 100 according to an embodiment of the described technology includes a plurality of pixels P and sensors S arranged on a substrate 110.

The plurality of pixels P may be defined by a plurality of gate lines GL1 to GLn (n is a natural number) arranged in a first direction D1 on the substrate 110 and a plurality of data lines DL1 to DLm (m is a natural number) arranged in a second direction D2 that crosses the first direction D1. The pixels P may receive a power signal that is supplied from an outside, gate signals that are supplied from a gate driving unit (not illustrated) through a plurality of gate lines GL1 to GLn, and data signals that are supplied from a data driving unit (not illustrated) through a plurality of data lines DL1 to DLm, and display an image.

Sensor S is formed in at least one of the pixels P. The sensor S can sense bending of the substrate 110 and pressure that is applied to the substrate 110 by a user's finger or a pen. FIG. 1 illustrates that the sensor S is formed in the pixels P, respectively. However, as illustrated in FIG. 2, one sensor may be formed for each group that includes at least two pixels P among the pixels P.

Next, a circuit of one pixel P, in which a sensor is formed, among the sensors P will be described.

Figure 3:
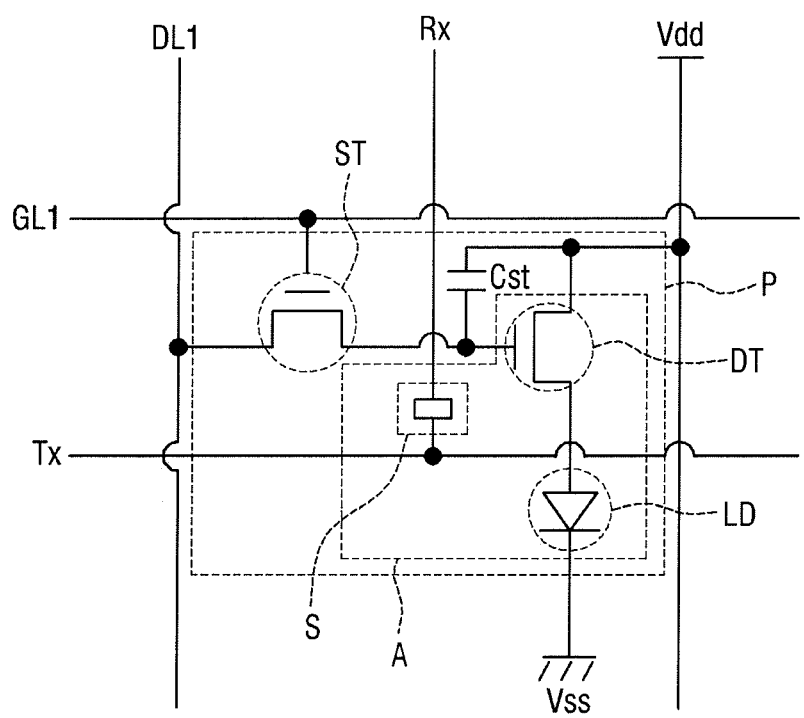
FIG. 3 is an exemplary circuit diagram of one of a plurality of pixels of that can be used with the embodiment shown in FIG. 1.

FIG. 3 is an exemplary circuit diagram of one of the pixels of that can be used with the embodiment shown in FIG. 1.

Referring to FIG. 3, one pixel P may be connected to a first gate line GL1 and a first data line DL1, and may include, for example, a switching transistor ST, a drive transistor DT, a storage capacitor Cst, a light emitting diode LD, and a sensor S.

The switching transistor ST may be implemented by a thin film transistor, and may include a gate electrode connected to the first gate line GL1, a source electrode connected to the first data line DL1, and a drain electrode connected to the gate electrode of the drive transistor. The switching transistor ST applies a voltage that corresponds to the data signal supplied through the first data line DL1 to the drive transistor DT in response to the gate signal received from the first gate line GL1.

The drive transistor DT may be implemented by a thin film transistor, and may include a gate electrode connected to the drain electrode of the switching transistor ST, a source electrode connected to a first power supply Vdd, and a drain electrode connected to an anode electrode (pixel electrode) of the light emitting diode LD. The drive transistor DT supplies current, which corresponds to a voltage applied to its gate electrode, to the light emitting diode LD.

The storage capacitor Cst is connected between the gate electrode of the drive transistor DT and the first power supply Vdd. The storage capacitor Cst charges the voltage that is applied to the gate electrode of the drive transistor DT.

The light emitting diode LD may include the anode electrode (or pixel electrode) connected to the drain electrode of the drive transistor DT, and a cathode electrode (or common electrode) connected to a second power supply Vss. The light emitting diode LD emits light corresponding to the current that is supplied from the drive transistor DT to display an image.

The sensor S may include a drive electrode connected to a driving line Tx, a sensing electrode connected to a sensing line Rx, and a deformation layer connected between the drive electrode and the sensing electrode. The sensor S may sense whether the bending of the substrate (110 in FIG. 1) or the pressure applied to the substrate 110 occurs through the sensing voltage of the sensing electrode which differs according to the change of resistance of the deformation layer. The sensing operation of the sensor S will be described later.

Next, the cross-sectional structure of the display device 100, which includes the drive transistor DT, the light emitting diode LD, and the sensor S, will be described in detail.

Figure 4:
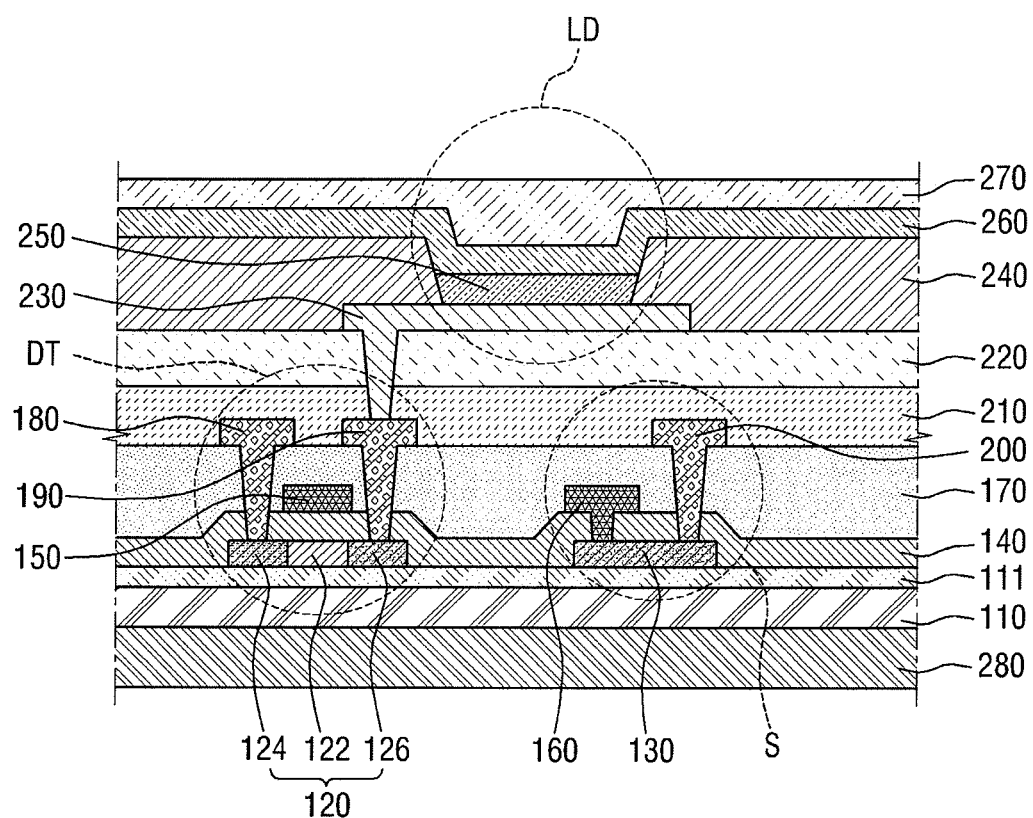
FIG. 4 is an exemplary cross-sectional view of a display device that can correspond to a portion "A" of FIG. 3.
Figure 5:
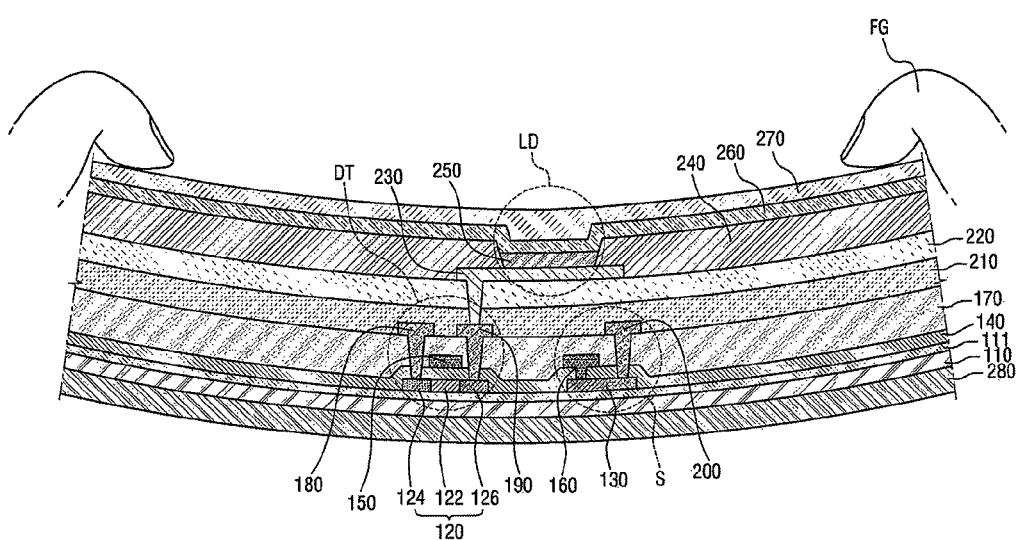
FIG. 5 is an exemplary cross-sectional view of a display device when the substrate of FIG. 4 is bent.
Figure 6:
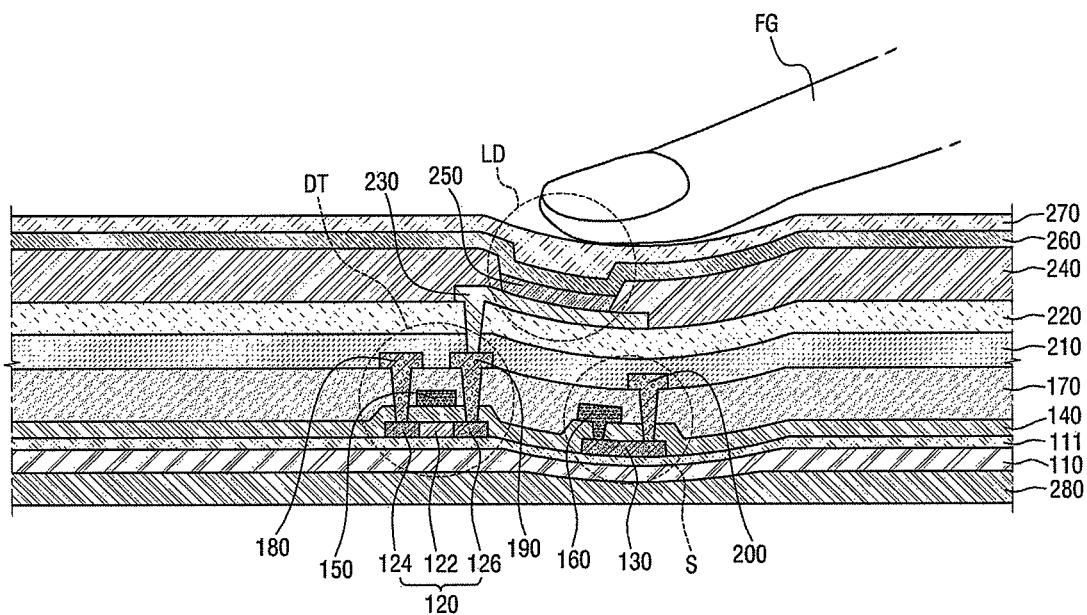
FIG. 6 is an exemplary cross-sectional view of a display device when pressure is applied to the substrate of FIG. 4.

FIG. 4 is an exemplary cross-sectional view of a display device that corresponds to a portion "A" of FIG. 3. FIG. 5 is an exemplary cross-sectional view of a display device when the substrate of FIG. 4 is bent, and FIG. 6 is an exemplary cross-sectional view of a display device when pressure is applied to the substrate of FIG. 4.

Referring to FIG. 4, the display device 100 may have a cross-sectional structure that includes one or more of the following: a substrate 110, a buffer layer 111, an active layer 120, a deformation layer 130, a gate insulating film 140, a gate electrode 150, a drive electrode 160, an interlayer insulating film 170, a source electrode 180, a drain electrode 190, a sensing electrode 200, a passivation layer 210, a planarization layer 220, a pixel electrode 230, a pixel-defining film 240, a light emitting layer 250, a common electrode 260, an encapsulation film 270, and a protection film 280. In the described technology, it is exemplified that the display device 100 is implemented by a flexible light emitting display device.

The substrate 110 may be a flexible substrate that is formed of plastic, for example, polyethylene etherphthalate, polyethylene naphthalate, polycarbonate, polyarylate, polyetherimide, polyethersulfone, or polyimide.

The buffer layer 111 may be formed on the substrate 110. The buffer layer 111 may intercept and prevent impurities generated from the substrate 110 or moisture flowing from an outside from being transferred to an upper layer. The buffer layer 111 may include at least one inorganic film, at least one organic film, or a stacked film in which the inorganic film and the organic film are combined and stacked.

The active layer 120 may include a channel region 122 and a source region 124 and a drain region 126 that are positioned on both sides of the channel region 122. The active layer 120 may be formed of, for example, amorphous silicon or polysilicon, and the source region 124 and the drain region 126 may be doped with p-type or n-type impurities.

The deformation layer 130 may be formed on the same layer as the active layer 120, and may be formed of the same material as the source region 124 or the drain region 126. That is, the deformation layer 130 may be formed of silicon, and may include p-type or n-type impurities. Accordingly, the deformation layer 130 may be formed together when the active layer 120 is formed. Since the deformation layer 130 is formed of silicon and has flexibility, the shape of the deformation layer 130 may be changed by the bending of the substrate 110 or the pressure applied to the substrate 110. As the shape of the deformation layer 130 is changed, the resistance of the deformation layer 130 may also be changed.

The gate insulating film 140 is formed on the substrate 110 to cover the active layer 120 and the deformation layer 130. The gate insulating film 140 electrically insulates the gate electrode 150 and the active layer 120 from each other. The gate insulating film 140 may be made of an insulating material, for example, silicon oxide (SiOx), silicon nitride (SiNx), or metal oxide.

The gate electrode 150 may be formed on the gate insulating film 140. The gate electrode 150 may be formed on an upper portion of the channel region 122, that is, on a position that corresponds to the channel region 122 on the gate insulating film 140. The gate electrode 150 may include metal, an alloy, metal nitride, conductive metal oxide, or a transparent material.

The drive electrode 160 may be formed on the same layer as the gate electrode 150, and may be formed of the same material as the gate electrode 150. Accordingly, the drive electrode 160 may be formed together when the gate electrode 120 is formed. The drive electrode 160 may be an electrode to which a constant voltage from the driving line Tx of FIG. 3 is applied to measure the sensing voltage of the sensing electrode 200 according to the change of the resistance of the deformation layer 130.

The interlayer insulating film 170 may be formed on the gate insulating film 140 to cover the gate electrode 150 and the drive electrode 160. The interlayer insulating film 170 may be made of silicon compound. For example, the interlayer insulating film 170 may include silicon oxide, silicon nitride, silicon oxynitride, silicon carbonitride, or silicon oxycarbide. The interlayer insulating film 170 may serve to insulate the gate electrode 150 from the source electrode 180 and the drain electrode 190.

The source electrode 180 and the drain electrode 190 may be formed on the interlayer insulating film 170. The source electrode 180 penetrates the interlayer insulating film 170 and the gate insulating film 140 to be connected to the source region 124 of the active layer 120, and the drain electrode 190 penetrates the interlayer insulating film 170 and the gate insulating film 140 to be connected to the drain region 126. The source electrode 180 and the drain electrode 190 may include metal, an alloy, metal nitride, conductive metal oxide, or transparent conductive material. For example, the source electrode 180 and the drain electrode 190 may be made of aluminum, an alloy containing aluminum, aluminum nitride, silver, an alloy containing silver, tungsten, tungsten nitride, copper, an alloy containing copper, nickel, chrome, chrome nitride, molybdenum, an alloy containing molybdenum, titanium, titanium nitride, platinum, tantalum, tantalum nitride, neodymium, scandium, strontium ruthenium oxide, zinc oxide, indium tin oxide, tin oxide, indium oxide, gallium oxide, or indium zinc oxide.

The sensing electrode 200 may be formed on the same layer as the source electrode 180 or the drain electrode 190, and may be formed of the same material as the source electrode 180 or the drain electrode 190. Accordingly, the sensing electrode 200 may be formed together when the source electrode 180 or the drain electrode 190 is formed. The sensing electrode 200 may be an electrode that is connected to the sensing line Rx of FIG. 3 to measure the sensing voltage according to the resistance of the deformation layer 130.

The passivation layer 210 may be formed on the interlayer insulating film 170 to cover the source electrode 180, the drain electrode 190, and the sensing electrode 200. The passivation layer 210 may be formed using an organic material or an inorganic material. For example, the passivation layer 210 may include photoresist, acrylic based polymer, polyimide based polymer, polyamide based polymer, siloxane based polymer, polymer including photosensitive acrylic carboxyl group, novolac resin, alkali-soluble resin, silicon oxide, silicon nitride, silicon oxynitride, silicon oxycarbide, silicon carbonitride, aluminum, magnesium, zinc, hafnium, zirconium, titanium, tantalum, aluminum oxide, titanium oxide, tantalum oxide, magnesium oxide, zinc oxide, hafnium oxide, zirconium oxide, or titanium oxide. In some embodiments, the passivation layer 210 may be omitted depending on the formation material or thickness of the planarization layer 220.

The planarization layer 220 may be formed on the passivation layer 210. The surface of the planarization layer 220 may be substantially flat. The planarization layer may planarize an upper portion of the substrate 110. The planarization layer 220 may be made of an insulating material. Further, the planarization layer 220 may be made of an organic material, for example, polyimide.

The pixel electrode 230 may be formed on the planarization layer 220, and may be connected to the drain electrode 190. The pixel electrode 230 may be an anode electrode which receives a signal that is applied to the drain electrode 190 and provides holes to the light emitting layer 250. In some embodiments, the pixel electrode 230 may be a cathode electrode which receives a signal that is applied to the drain electrode 190 and provides electrons to the light emitting layer 250. The pixel electrode 230 may include metal, an alloy, metal nitride, conductive metal oxide, or a transparent conductive material. For example, the pixel electrode 230 may be made of aluminum, an alloy containing aluminum, aluminum nitride, silver, an alloy containing silver, tungsten, tungsten nitride, copper, an alloy containing copper, nickel, chrome, chrome nitride, molybdenum, an alloy containing molybdenum, titanium, titanium nitride, platinum, tantalum, tantalum nitride, neodymium, scandium, strontium ruthenium oxide, zinc oxide, indium tin oxide, tin oxide, indium oxide, gallium oxide, or indium zinc oxide.

The pixel-defining film 240 may be formed on the planarization layer 220 and may include an opening to expose the pixel electrode 230. The pixel-defining film 240 may include an insulating material, for example, at least one organic material selected from the group including benzo cyclo butene (BCB), polyimide (PI), poly amaide (PA), acrylic resin, and phenol resin. As another example, the pixel-defining film 240 may include an inorganic material, such as silicon nitride.

The light emitting layer 250 is formed on the pixel electrode 230 that is exposed through the opening of the pixel-defining film 240. The light emitting layer 250 emits light through recombination of holes provided from the pixel electrode 230 and electrons provided from the common electrode 270. More specifically, if holes and electrons are provided to the light emitting layer 250, the holes and the electrons are recombined to generate exitons. As the exitons are changed from an exited state to a ground state, the light emitting layer 250 emits light. The light emitting layer 250 may be implemented by a red light emitting layer that emits red light, a green light emitting layer that emits green light, and a blue light emitting layer that emits blue light for each pixel. The light emitting layer 250 may be formed of an inorganic material including Se or Zn, or a low-molecular or high-molecular organic material. On the other hand, according to at least one of the disclosed embodiments, the display device 100 includes the light emitting layer 250 and is implemented by a light emitting display device. However, if the display device 100 includes a liquid crystal layer instead of the light emitting layer 250, it may be implemented by a liquid crystal display device.

The common electrode 260 may be formed on the light emitting layer 250. The common electrode 260 may be a cathode electrode that provides electrons to the light emitting layer 250. In some embodiments, the common electrode 260 may be an anode electrode that provides holes to the light emitting layer 250. The common electrode 260 may be formed of a material, such as a formation material of the pixel electrode 230.

The encapsulation film 270 may be formed on the common electrode 260. The encapsulation film 270 may be a flexible encapsulation film that may be formed of plastic, for example, polyethylene etherphthalate, polyethylene naphthalate, polycarbonate, polyarylate, polyetherimide, polyethersulfone, or polyimide.

The protection film 280 may be arranged on a lower portion of the substrate 110. Although not illustrated, the protection film 280 may be attached to the lower surface of the substrate 110 using adhesives. The protection film 280 may be formed of an elastic material, for example, rubber or silicon material. The protection film 280 may have a thin thickness, reinforce the mechanical strength of the flexible substrate 110, and if pressure is applied to the substrate 110, make the deformation layer 130 be well deformed using the elastic force thereof to facilitate the sensing operation of the sensor S.

In the cross-sectional structure of the display device 100 as described above, the active layer 120, the gate electrode 150, the source electrode 180, and the drain electrode 190 may constitute the drive transistor DT. The drive transistor DT may drive the light emitting diode LD.

Further, the deformation layer 130, the drive electrode 160, and the sensing electrode 200 may constitute the sensor S. The sensor S may be formed in the display device 100, and sense the bending of the substrate 110 and the pressure applied to the substrate 110 using the change of the electrical characteristic that the sensing voltage of the sensing electrode 200 differ according to the change of the resistance of the deformation layer 130. Here, the sensor S may be adjacently arranged at substantially the same vertical level as the thin film transistor, for example, the drive transistor DT. The deformation layer 130, the drive electrode 160, and the sensing electrode 200 of the sensor S may be formed of the same materials as the active layer 120, the gate electrode 150, and the source electrode 180 (or drain electrode 190) of the drive transistor DT, respectively. Accordingly, a separate process for forming the sensor S is not required.

Further, the pixel electrode 230, the light emitting layer 240, and the common electrode 260 may constitute the light emitting diode LD. The light emitting diode LD is driven by the drive transistor DT to emit light and thus an image is displayed.

Next, the operation of the sensor S will be described in further detail.

FIG. 5 is an exemplary cross-sectional view of a display device when the substrate of FIG. 4 is bent, and FIG. 6 is an exemplary cross-sectional view of a display device when pressure is applied to the substrate of FIG. 4.

Referring to FIG. 5, in the case where the substrate 110 is bent by a user's finger FG, the shape of the deformation layer 130 may be changed from a flat state to a bent state. At this time, as the shape of the deformation layer 130 is changed, the resistance of the deformation layer 130 may be changed, and thus the sensing voltage of the sensing electrode 200 may be different from the reference voltage. Through this, it can be sensed that the bending of the substrate 110 occurs. Here, the reference voltage may be a voltage of the sensing electrode 200 when the substrate 110 is not bent and the pressure is not applied to the substrate 110, or may be set in advance through experimental values.

For example, in the case where the substrate 110 is not bent and the pressure is not applied to the substrate 110, the resistance of the deformation layer 130 may be about 100Ω, and the resistance of a resistor element (not illustrated) that is installed in the sensing line Rx is about 100Ω. In this state, if the voltage that is applied to the drive electrode 160 is about 4V, the voltage of the sensing electrode 200 may be about 2V. Here, the reference voltage may be about 2V as a voltage of the sensing electrode 200 in the case where the substrate 110 is not bent and the pressure is not applied to the substrate 110.

If the substrate 110 is bent in a state where the reference voltage is set as described above, the shape of the deformation layer 130 is changed, and the resistance of the deformation layer 130 becomes about 110Ω and the resistance of a resistor element that is installed in the sensing line Rx is about 100Ω. In this state, if the voltage that is applied to the drive electrode 160 is about 4V, the voltage of the sensing electrode 200 may be about 2.09V. As described above, if the substrate 110 is bent, the sensing voltage of the sensing electrode 200 becomes about 2.09V, which is different from about 2V that is the reference voltage, and thus it can be sensed that the bending of the substrate 110 occurs through the sensing voltage of the sensing electrode 200 that is different from the reference voltage.

Although not illustrated, the sensing voltage of the sensing electrode 200 may be detected by a control unit (or controller, not illustrated). If the bending of the substrate 110 occurs and the controller determines that the sensing voltage of the sensing electrode 200 is different from the reference voltage, an operation, such as adjustment of a touch volume or a music volume of the display device 100 or turning of the pages, may be performed. That is, the bending of the substrate 110 may be, for example, an input signal for the operation of the adjustment of the touch volume or the music volume of the display device 100 or the operation of turning of the pages.

Referring to FIG. 6, if the pressure is applied to the substrate 110 by the user's finger FG, the shape of the deformation layer 130 may be changed from the flat state to the bent state. At this time, as the shape of the deformation layer 130 is changed, the resistance of the deformation layer 130 may be changed, and thus the sensing voltage of the sensing electrode 200 may be different from the reference voltage. Through this, it can be sensed that the pressure is applied to the substrate 110. Further, since it can be sensed that the pressure that is applied to the substrate 110 occurs at a pixel portion, in which the sensing electrode 200 having different voltage from the reference voltage is included, and thus the position of the substrate 110 where the pressure occurs can also be sensed. Here, the reference voltage may be a voltage of the sensing electrode 200 when the substrate 110 is not bent and the pressure is not applied to the substrate 110, or may be set in advance through experimental values.

For example, in the case where the substrate 110 is not bent and the pressure is not applied to the substrate 110, the resistance of the deformation layer 130 may be about 100Ω, and the resistance of a resistor element (not illustrated) that is installed in the sensing line Rx is about 100Ω. In this state, if the voltage that is applied to the drive electrode 160 is about 4V, the voltage of the sensing electrode 200 may be about 2V. Here, the reference voltage may be about 2V as a voltage of the sensing electrode 200 in the case where the substrate 110 is not bent and the pressure is not applied to the substrate 110.

If the pressure is applied to the substrate 110 in a state where the reference voltage is set as described above, the shape of the deformation layer 130 is changed, and the resistance of the deformation layer 130 becomes about 120Ω and the resistance of a resistor element that is installed in the sensing line Rx is about 100Ω. In this state, if the voltage that is applied to the drive electrode 160 through the driving line Tx is about 4V, the voltage of the sensing electrode 200 may be about 2.18V. As described above, if the pressure is applied to the substrate 110, the sensing voltage of the sensing electrode 200 becomes about 2.18V, which is different from about 2V that is the reference voltage, and thus it can be sensed that the pressure is applied to the substrate 110 through the sensing voltage of the sensing electrode 200 that is different from the reference voltage. Further, since it can be sensed that the pressure that is applied to the substrate 110 occurs at a pixel portion, in which the sensing electrode 200 having different voltage from the reference voltage is included, and thus the position of the substrate 110 where the pressure occurs can also be sensed.

Although not illustrated, the sensing voltage of the sensing electrode 200 may be detected by a controller (not illustrated). If the pressure is applied to the substrate 110 and the controller determines that the sensing voltage of the sensing electrode 200 is different from the reference voltage, an operation, such as pressing of a keyboard of the display device 100 or page zoom-in or zoom-out, may be performed. That is, the pressure that is applied to the substrate 110 may be, for example, an input signal for the operation of the pressing of the substrate 110 or the page zoom-in or zoom-out.

As described above, the display device 100 according to an embodiment of the described technology includes the sensor S that is adjacently arranged at substantially the same vertical level as that of the thin film transistor, for example, the drive transistor DT, in the pixel P, and the protection film 280 arranged on the lower portion of the substrate 110, and thus can sense the bending of the substrate 110 and the pressure applied to the substrate 110. Accordingly, the display device 100 according to an embodiment of the described technology can perform various operations with respect to the bending of the substrate 110 and the pressure applied to the substrate 110, which are considered as the input signals.

Further, according to the display device 100 according to an embodiment of the described technology, since the sensor S is formed together when the thin film transistor, for example, the drive transistor DT, is formed, it is not necessary to add a separate process for forming the sensor, and thus the manufacturing costs and manufacturing processes for the separate process for forming the sensor can be reduced.

Next, a display device 300 according to another embodiment of the described technology will be described.

Figure 7:
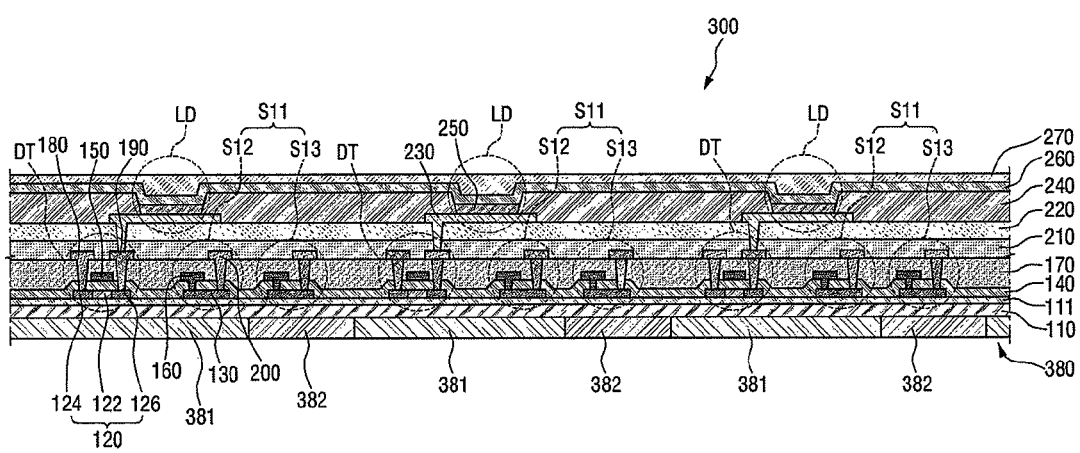
FIG. 7 is a cross-sectional view of a display device according to another exemplary embodiment of the described technology that is similar to FIG. 4.

FIG. 7 is an exemplary cross-sectional view of a display device according to another embodiment of the described technology corresponding to FIG. 4. In FIG. 7, a plurality of pixels, each of which includes a drive transistor DT, a light emitting diode LD, and a sensor S11, are illustrated.

Referring to FIG. 7, a display device 300 according to another embodiment of the described technology has a similar configuration as the display device 100 of FIG. 4 except for the configuration of the sensor S11 and a protection film 380. Accordingly, explanation will be made around the protection film 380 only in the display device 300 according to another embodiment of the described technology.

The sensor S11 is similar to the sensor S of FIG. 4. However, the sensor S11 includes two sensors, that is, a first sensor S12 and a second sensor S13, for one pixel. The first sensor S12 and the second sensor S13 may be arranged to be alternately positioned in one pixel and in another adjacent pixel. That is, the second sensor S13 that is included in one pixel may be adjacent to the first sensor S12 included in another pixel.

The first sensor S12 may be formed of the same material as the sensor S of FIG. 4 at substantially the same position. The second sensor S13 may be formed of the same material as the first sensor S12 at a position that is adjacent to the first sensor S12 in the horizontal direction.

The respective deformation layers 130 of the first sensor S12 and the second sensor S13 may have substantially the same resistance change characteristics with respect to the bending of the substrate 110, and thus is bending of the substrate 110 occurs, a first sensing voltage of a sensing electrode 200 of the first sensor S12 may be substantially equal to a second sensing voltage of a sensing electrode 200 of the second sensor S13. Through this, it can be sensed that the bending of the substrate 110 occurs. On the other hand, if the first sensor S12 and the second sensor S13 have different resistance change characteristics with respect to the bending of the substrate 110, they can sense the bending of the substrate 110 through correction.

The respective deformation layers 130 of the first sensor S12 and the second sensor S13 may have different resistance changes with respect to the pressure applied to the substrate 110, and if the pressure is applied to the substrate 110, the first sensing voltage of the sensing electrode 200 of the first sensor S12 may be different from the second sensing voltage of the sensing electrode 200 of the second sensor S13. Through this, it can be sensed that the pressure is applied to the substrate 110. Further, since it can be sensed that the pressure that is applied to the substrate 110 occurs at a pixel portion, in which the first sensing voltage and the second sensing voltage are different from each other, and thus the position of the substrate 110 where the pressure occurs can also be sensed.

The protection film 380 may be arranged on a lower portion of the substrate 110. Although not illustrated, the protection film 380 may be attached to the lower surface of the substrate 110 using adhesives. The protection film 380 may be formed of a plastic material, and may have flexibility like the substrate 110. The protection film 380 may have a thin thickness and reinforce the mechanical strength of the flexible substrate 110.

The protection film 380 may include a first portion 381 which is formed in a region that corresponds to the first sensor S12 and a second portion 382 which is formed in a region that corresponds to the second sensor S13. The first portion 381 may be formed of a plastic material having a first deformation ratio with respect to the pressure applied to the substrate 110. The second portion 382 may be formed of a plastic material having a second deformation ratio that is higher than the first deformation ratio with respect to the pressure applied to the substrate 110.

If the bending of the substrate 110 occurs, the first portion 381 and the second portion 382 may have substantially the same deformation ratio. In this case, the resistance of the deformation layer 130 of the first sensor S12 is substantially equal to the resistance of the deformation layer 130 of the second sensor S13, and thus the first sensing voltage of the sensing electrode 200 of the first sensor S12 becomes substantially equal to the second sensing voltage of the sensing electrode 200 of the second sensor S13.

Further, the first portion 381 and the second portion 382 have different deformation ratios with respect to the pressure applied to the substrate 110, and if the pressure is applied to the substrate 110, the first sensor S12 and the second sensor S13 have different elastic forces. Accordingly, the resistance of the deformation layer 130 of the first sensor S12 and the resistance of the deformation layer 130 of the second sensor S12 become different from each other, and thus the first sensing voltage of the sensing electrode 200 of the first sensor S12 and the second sensing voltage of the sensing electrode 200 of the second sensor S13 become different from each other.

As described above, the display device 300 according to another embodiment of the described technology includes the sensor S11 that is adjacently arranged at substantially the same vertical level as that of the thin film transistor, for example, the drive transistor DT, in the pixel, and the protection film 380 arranged on the lower portion of the substrate 110, and thus can sense the bending of the substrate 110 and the pressure applied to the substrate 110. Accordingly, the display device 300 according to another embodiment of the described technology can perform various operations with respect to the bending of the substrate 110 and the pressure applied to the substrate 110, which are considered as the input signals.

Further, the display device 300 according to another embodiment of the described technology can clearly discriminate between the bending of the substrate 110 and the pressure applied to the substrate 110 through the sensor S11 including the first sensor S12 and the second sensor S13 and the protection film 380 including the first portion 381 and the second portion 382.

Further, according to the display device 300 according to another embodiment of the described technology, since the sensor S11 is formed together when the thin film transistor, for example, the drive transistor DT, is formed, it is not necessary to add a separate process for forming the sensor, and thus the manufacturing costs and manufacturing processes for the separate process for forming the sensor can be reduced.

Next, a display device 400 according to still another embodiment of the described technology will be described.

Figure 8:
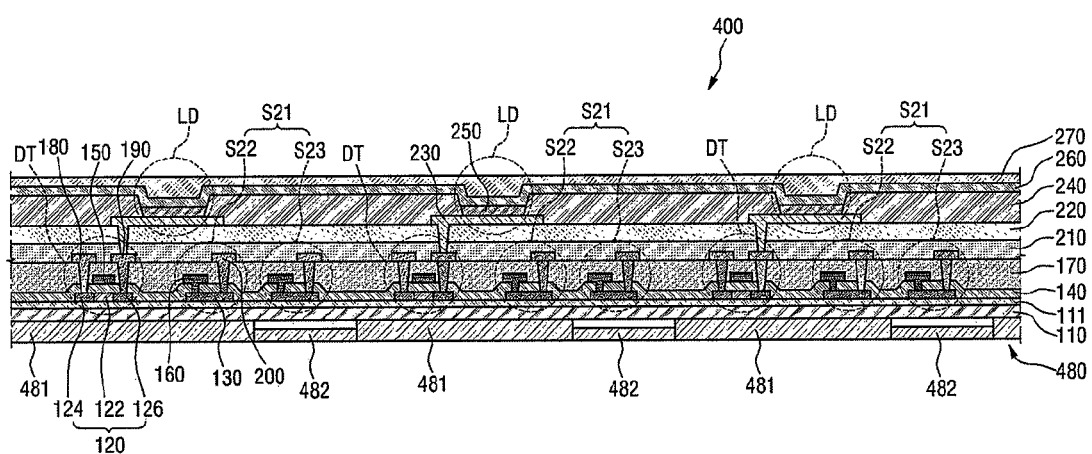
FIG. 8 is a cross-sectional view of a display device according to still another exemplary embodiment of the described technology that is similar to FIG. 7.

FIG. 8 is a cross-sectional view of a display device according to still another exemplary embodiment of the described technology that is similar to FIG. 7.

Referring to FIG. 8, a display device 400 according to still another embodiment of the described technology has substantially the same configuration as the display device 300 of FIG. 7 except for the configuration of a protection film 480. Accordingly, explanation will be made around the protection film 480 only in the display device 400 according to still another embodiment of the described technology.

The protection film 480 may be arranged on a lower portion of the substrate 110. Although not illustrated, the protection film 480 may be attached to the lower surface of the substrate 110 using adhesives. The protection film 480 may be formed of a plastic material, and may have flexibility like the substrate 110. The protection film 480 may have a thin thickness and reinforce the mechanical strength of the flexible substrate 110.

The protection film 480 may include a first portion 481 which is formed in a region that corresponds to the first sensor S12 and a second portion 482 which is formed in a region that corresponds to the second sensor S13. The first portion 481 may have a first thickness. The second portion 482 may have a second thickness that is smaller than the first thickness. Here, a gap space may be formed between the substrate 110 and the second portion 482.

If the bending of the substrate 110 occurs, the first portion 481 and the second portion 482 may make the resistance of the deformation layer 130 of the first sensor S12 be substantially equal to the resistance of the deformation layer 130 of the second sensor S13, and thus the first sensing voltage of the sensing electrode 200 of the first sensor S12 may become substantially equal to the second sensing voltage of the sensing electrode 200 of the second sensor S13.

Further, if the pressure is applied to the substrate 110 through the gap space between the substrate 110 and the second portion 482, the first portion 481 and the second portion 482 may make the first sensor S12 and the second sensor S13 have different elastic forces. Accordingly, the resistance of the deformation layer 130 of the first sensor S12 and the resistance of the deformation layer 130 of the second sensor S13 become different from each other, and thus the first sensing voltage of the sensing electrode 200 of the first sensor S12 and the second sensing voltage of the sensing electrode 200 of the second sensor S13 become different from each other.

As described above, the display device 400 according to still another embodiment of the described technology includes the sensor S11 that is adjacently arranged at substantially the same vertical level as that of the thin film transistor, for example, the drive transistor DT, in the pixel, and the protection film 480 arranged on the lower portion of the substrate 110, and thus can sense the bending of the substrate 110 and the pressure applied to the substrate 110. Accordingly, the display device 400 according to still another embodiment of the described technology can perform various operations with respect to the bending of the substrate 110 and the pressure applied to the substrate 110, which are considered as the input signals.

Further, the display device 400 according to still another embodiment of the described technology can clearly discriminate between the bending of the substrate 110 and the pressure applied to the substrate 110 through the sensor S11 including the first sensor S12 and the second sensor S13 and the protection film 480 including the first portion 481 and the second portion 482.

Further, according to the display device 400 according to still another embodiment of the described technology, since the sensor S11 is formed together when the thin film transistor, for example, the drive transistor DT, is formed, it is not necessary to add a separate process for forming the sensor, and thus the manufacturing costs and manufacturing processes for the separate process for forming the sensor can be reduced.

Next, a display device 500 according to still another embodiment of the described technology will be described.

Figure 9:
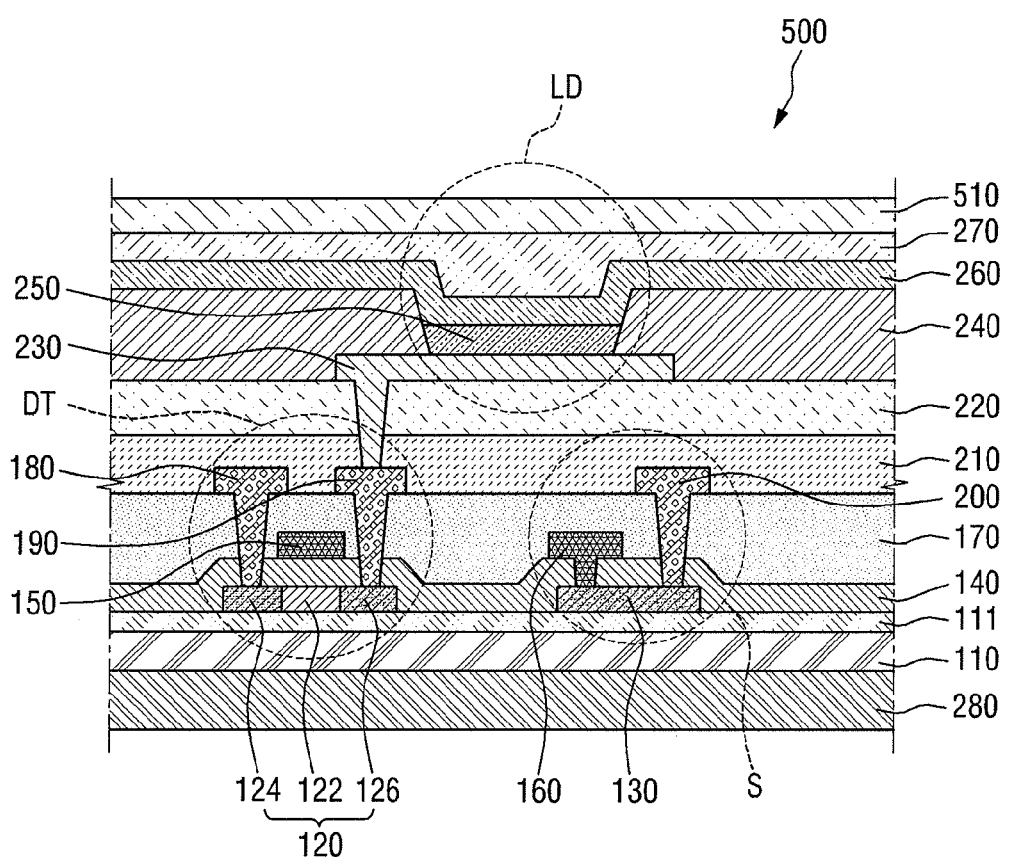
FIG. 9 is an exemplary cross-sectional view of a display device according to still another embodiment of the described technology that is similar to FIG. 4.

FIG. 9 is an exemplary cross-sectional view of a display device according to still another embodiment of the described technology that is similar to FIG. 4.

Referring to FIG. 9, a display device 500 according to still another embodiment of the described technology has substantially the same configuration as the display device 100 of FIG. 4 only except that a touch panel 510 is further included. Accordingly, explanation will be made around the touch panel 500 only in the display device 500 according to still another embodiment of the described technology.

The touch panel 510 may be formed on the common electrode 260. The touch panel 510 may sense the position on the screen that the user comes in contact with, and perform screen control functions of the display device using information on the sensed contact position as input information. The touch panel 510 may be formed to include a transparent base material and a transparent conductive film formed on the transparent base material for resistive and capacitive sensing. Here, the sensor S can perform another screen control function in addition to the screen control function of the display device through the touch panel 510, and if the sensing function of the touch panel 510 is deteriorated, the sensor S may assist the screen control function of the display device.

As described above, the display device 500 according to still another embodiment of the described technology includes the sensor S that is adjacently arranged at substantially the same vertical level as the thin film transistor, for example, the drive transistor DT, the protection film 280 arranged on the lower portion of the substrate 110, and the touch panel 510 formed on the common electrode 260, and thus can perform various operations, such as the screen control of the display device, to improve the reliability of the screen control function of the touch panel 510.

Next, a method for driving the display device 100 according to an embodiment of the described technology, as illustrated in FIGS. 1 to 6, will be described.

Figure 10:
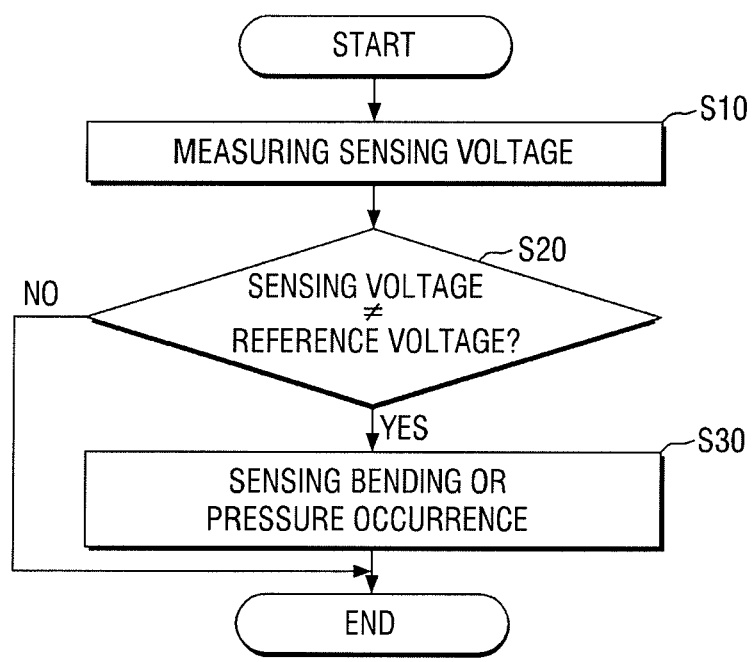
FIG. 10 is an exemplary flowchart illustrating a method for driving a display device according to an embodiment of the described technology.

FIG. 10 is a flowchart illustrating a method for driving a display device according to an embodiment of the described technology. In one embodiment, the FIG. 10 procedure is implemented in a conventional programming language, such as C or C++ or another suitable programming language. In one embodiment, the program is stored on a computer accessible storage medium of the display device, for example, a memory (not shown) of the display device or a processor. In one embodiment, the storage medium comprises a random access memory (RAM), hard disks, floppy disks, digital video devices, compact discs, video discs, and/or other optical storage mediums, etc. The program may be stored in the processor. In various embodiments, the processor may have a configuration based on, for example, i) an advanced RISC machine (ARM) microcontroller and ii) Intel Corporation's microprocessors (e.g., the Pentium family microprocessors). In one embodiment, the processor is implemented with a variety of computer platforms using a single chip or multichip microprocessors, digital signal processors, embedded microprocessors, microcontrollers, etc. In another embodiment, the processor is implemented with a wide range of operating systems such as Unix, Linux, Microsoft DOS, Microsoft Windows 7/Vista/2000/9x/ME/XP, Macintosh OS, OS/2, Android, iOS and the like. In another embodiment, at least part of the procedure can be implemented with embedded software. Depending on the embodiment, additional states may be added, others removed, or the order of the states changes in FIG. 10.

Referring to FIG. 10, a method for driving a display device 100 according to an embodiment of the described technology may include measuring a sensing voltage (S10), comparing the sensing voltage with a reference voltage (S20), and sensing bending or pressure occurrence (S30).

In S10, the sensing voltage is measured using the sensor S, which is formed in at least one of a plurality of pixels P defined by a plurality of gate lines GL1 to GLn arranged in a first direction D1 on the substrate and a plurality of data lines DL1 to DLm arranged in a second direction D2 that crosses the first direction D1, and is adjacently arranged at substantially the same vertical level as that of a thin film transistor, for example, a drive transistor DT, formed on the substrate 110.

The sensing voltage may be obtained by applying a constant voltage to the drive electrode 160 of the sensor S and measuring the voltage of the sensing electrode 200. On the other hand, if the sensor S11 includes the first sensor S12 and the second sensor S13 as shown in FIGS. 7 and 8, a first sensing voltage of the first sensor S12 and a second sensing voltage of the second sensor S13 may be measured as the sensing voltage.

In S20, it is determined whether the sensing voltage is different from the reference voltage. Here, the reference voltage may be a voltage of the sensing electrode 200 that is measured in a state where the bending of the substrate 110 does not occur and pressure is not applied to the substrate 110, or may be predetermined through experimental values. On the other hand, if the sensor S11 includes the first sensor S12 and the second sensor S13 as shown in FIGS. 7 and 8, it may be determined whether the first sensing voltage of the first sensor S12 and the second sensing voltage of the second sensor S13 are different from the reference voltage.

In S30, it is sensed whether the bending of the substrate 110 or the pressure applied to the substrate 110 occurs if it is determined that the sensing voltage is different from the reference voltage in S20. If the bending of the substrate 110 or the pressure applied to the substrate 110 occurs, the shape of the deformation layer 130 of the sensor S may be changed, and the resistance of the deformation layer 130 may be changed according to the deformed shaped. In this case, the sensing voltage of the sensing electrode 200 may be different from the reference voltage. On the other hand, if the sensor S11 includes the first sensor S12 and the second sensor S13, it is sensed that the bending of the substrate 110 occurs if both the first sensing voltage of the first sensor S12 and the second sensing voltage of the second sensor S13 are different from the reference voltage and the first sensing voltage is substantially equal to the second sensing voltage in S20, and it is sensed that the pressure occurs on the substrate 110 if the first sensing voltage and the second sensing voltage are different from each other.

In concluding the detailed description, those skilled in the art will appreciate that many variations and modifications can be made to the preferred embodiments without substantially departing from the principles of the described technology. Therefore, the disclosed preferred embodiments of the invention are used in a generic and descriptive sense only and not for purposes of limitation.

What is claimed is:

1. A display device comprising:
    a plurality of pixels formed over a substrate; and
    at least one sensor formed in at least one of the pixels and adjacently arranged at substantially the same vertical level as that of a thin film transistor formed over the substrate, wherein the sensor is configured to sense bending of the substrate and pressure that is applied to the substrate,
    wherein the sensor comprises:
    a deformation layer having resistance configured to change according to at least one of the bending of the substrate or the pressure applied to the substrate, wherein the deformation layer comprises first and second sides opposing each other;
    a driving electrode electrically connected to the first side of the deformation layer; and
    a sensing electrode electrically connected to the second side of the deformation layer.

2. The display device of claim 1, wherein the thin film transistor comprises i) an active layer including a channel region, a source region and a drain region positioned on both sides of the channel region, ii) a gate electrode formed on an upper portion of the channel region of the active layer, iii) a source electrode electrically connected to the source region of the active layer, and iv) a drain electrode electrically connected to the drain region of the active layer, and
    wherein the deformation layer is formed on the same layer as the active layer, wherein the driving electrode is formed on the same layer as the gate electrode, and wherein the sensing electrode is formed on the same layer as the source electrode or the drain electrode.

3. The display device of claim 2, wherein the active layer is formed of silicon, and wherein the source region and the drain region include impurities, and wherein the deformation layer is formed of the same material as the source region or the drain region.

4. The display device of claim 1, wherein the sensor is formed in each pixel or is formed for each group that includes at least two of the pixels.

5. The display device of claim 1, further comprising a protection film arranged on a lower portion of the substrate and formed of an elastic material.

6. The display device of claim 1, wherein the sensor includes a first sensor and a second sensor which are adjacent to each other, and wherein the display device further comprises a protection film including i) a first portion which is formed in a region of a lower portion of the substrate that corresponds to the first sensor and has a first deformation ratio with respect to the pressure applied to the substrate, and ii) a second portion which is formed in a region of the lower portion of the substrate that corresponds to the second sensor and has a second deformation ratio that is greater than the first deformation ratio with respect to the pressure applied to the substrate.

7. The display device of claim 1, wherein the sensor includes a first sensor and a second sensor which are adjacent to each other, and wherein the display device further comprises a protection film including i) a first portion which is formed in a region of a lower portion of the substrate that corresponds to the first sensor and has a first thickness, and ii) a second portion which is formed in a region of the lower portion of the substrate that corresponds to the second sensor and has a second thickness that is less than the first thickness.

8. The display device of claim 7, wherein a gap space is formed between the substrate and the second portion.

9. The display device of claim 1, wherein the substrate is formed of plastic.

10. The display device of claim 1, further comprising:
    a pixel electrode electrically connected to the thin film transistor;
    a light emitting layer formed over the pixel electrode;
    a common electrode formed over the light emitting layer; and
    a touch panel formed over the common electrode.

11. The display device of claim 1, wherein the sensor has a height substantially the same as that of the thin film transistor.

12. A display device comprising:
    a plurality of pixels formed over a substrate;
    a thin film transistor formed in each of the pixels, and including an i) active layer having a channel region, a source region and a drain region positioned on both sides of the channel region, ii) a gate electrode formed over an upper portion of the channel region of the active layer, iii) a source electrode electrically connected to the source region, and iv) a drain electrode electrically connected to the drain region; and
    at least one sensor formed in at least one of the pixels configured to sense at least one of bending of the substrate or pressure that is applied to the substrate, and including i) a deformation layer formed on the same layer as the active layer, wherein the deformation layer comprises first and second sides opposing each other ii) a driving electrode formed on the same layer as the gate electrode and electrically connected to the first side of the deformation layer, and iii) a sensing electrode formed on the same layer as the source electrode or the drain electrode and electrically connected to the second side of the deformation layer.

13. The display device of claim 12, wherein the sensor is formed in each pixel or is formed for each group that includes at least two of the pixels.

14. The display device of claim 12, further comprising a protection film arranged on a lower portion of the substrate and formed of an elastic material.

15. The display device of claim 12, wherein the sensor includes a first sensor and a second sensor which are adjacent to each other, and wherein the display device further comprises a protection film including i) a first portion which is formed in a region of a lower portion of the substrate that corresponds to the first sensor and has a first deformation ratio with respect to the pressure applied to the substrate, and ii) a second portion which is formed in a region of the lower portion of the substrate that corresponds to the second sensor and has a second deformation ratio that is greater than the first deformation ratio with respect to the pressure applied to the substrate.

16. The display device of claim 12, wherein the sensor includes a first sensor and a second sensor which are adjacent to each other, and wherein the display device further comprises a protection film including i) a first portion which is formed in a region of a lower portion of the substrate that corresponds to the first sensor and has a first thickness, and ii) a second portion which is formed in a region of the lower portion of the substrate that corresponds to the second sensor and has a second thickness that is less than the first thickness.

17. The display device of claim 12, further comprising:
a pixel electrode electrically connected to the drain electrode;
a light emitting layer formed over the pixel electrode;
a common electrode formed over the light emitting layer; and
a touch panel formed over the common electrode.

18. A method for driving a display device including a plurality of pixels, the method comprising:
measuring, with a sensor, at least one sensing voltage based on sensing bending of a substrate and pressure that is applied to the substrate, wherein the sensor is formed in at least one of the pixels and adjacently arranged at substantially the same vertical level as that of a thin film transistor formed over the substrate;
determining whether the sensing voltage is different from a reference voltage; and
recognizing that the bending of the substrate or the pressure applied to the substrate occurs if it is determined that the sensing voltage is different from the reference voltage, and
wherein the sensor comprises i) a deformation layer having resistance configured to change based on at least one of the bending of the substrate or the pressure applied to the substrate, wherein the deformation layer comprises first and second sides opposing each other ii) a driving electrode electrically connected to the first side of the deformation layer, and iii) a sensing electrode electrically connected to the second side of the deformation layer.

19. The method for driving a display device of claim 18, wherein measurement through the sensing electrode is performed by applying a constant voltage to the driving electrode and measuring a voltage of the sensing electrode.

20. The method for driving a display device of claim 18, wherein the sensor includes a first sensor and a second sensor which are adjacent to each other, wherein the measuring comprises measuring a first sensing voltage of the first sensor and a second sensing voltage of the second sensor, and
wherein the determining comprises sensing that the bending of the substrate occurs if both of the first and second sensing voltages are different from the reference voltage and the first sensing voltage is substantially equal to the second sensing voltage, and sensing that the pressure occurs on the substrate if the first sensing voltage is different from the second sensing voltage.

* * * * *